United States Patent [19]

Bell

[11] Patent Number: 4,867,604

[45] Date of Patent: Sep. 19, 1989

[54] UNIFIED MONITORING SYSTEM FOR HAZARDOUS AND TOXIC WASTE

[76] Inventor: Gordon L. Bell, 515 N. 22nd St., Bismarck, N. Dak. 58501

[21] Appl. No.: 928,115

[22] Filed: Nov. 6, 1986

[51] Int. Cl.⁴ .............................................. E02C 3/00
[52] U.S. Cl. .................................. 405/128; 405/129; 405/52
[58] Field of Search ............. 405/128, 129, 52, 53–59

[56] References Cited

U.S. PATENT DOCUMENTS

| | | | |
|---|---|---|---|
| 3,908,385 | 9/1975 | Daniel et al. | 405/37 |
| 4,352,601 | 10/1982 | Valiga et al. | 405/128 X |
| 4,464,081 | 8/1984 | Hillier et al. | 405/128 |
| 4,624,604 | 11/1986 | Wagner et al. | 405/128 |

Primary Examiner—Dennis L. Taylor

[57] ABSTRACT

A unified system for monitoring hazardous and toxic waste is provided as a built-in three dimensional monitoring system designed and installed prior to the waste and extended as the waste is accumulated and thus provides monitoring for leaks of hazardous waste below the base, at the base and throughout the contained or uncontained mass of waste, regardless of design, construction, and function or malfunction of the mass. This replaces post depositional, random drilling to locate possible leaks from the mass of hazardous waste and provides a three dimensional unit for monitoring the deposit for the protection of the ground water and the environment.

2 Claims, 1 Drawing Sheet

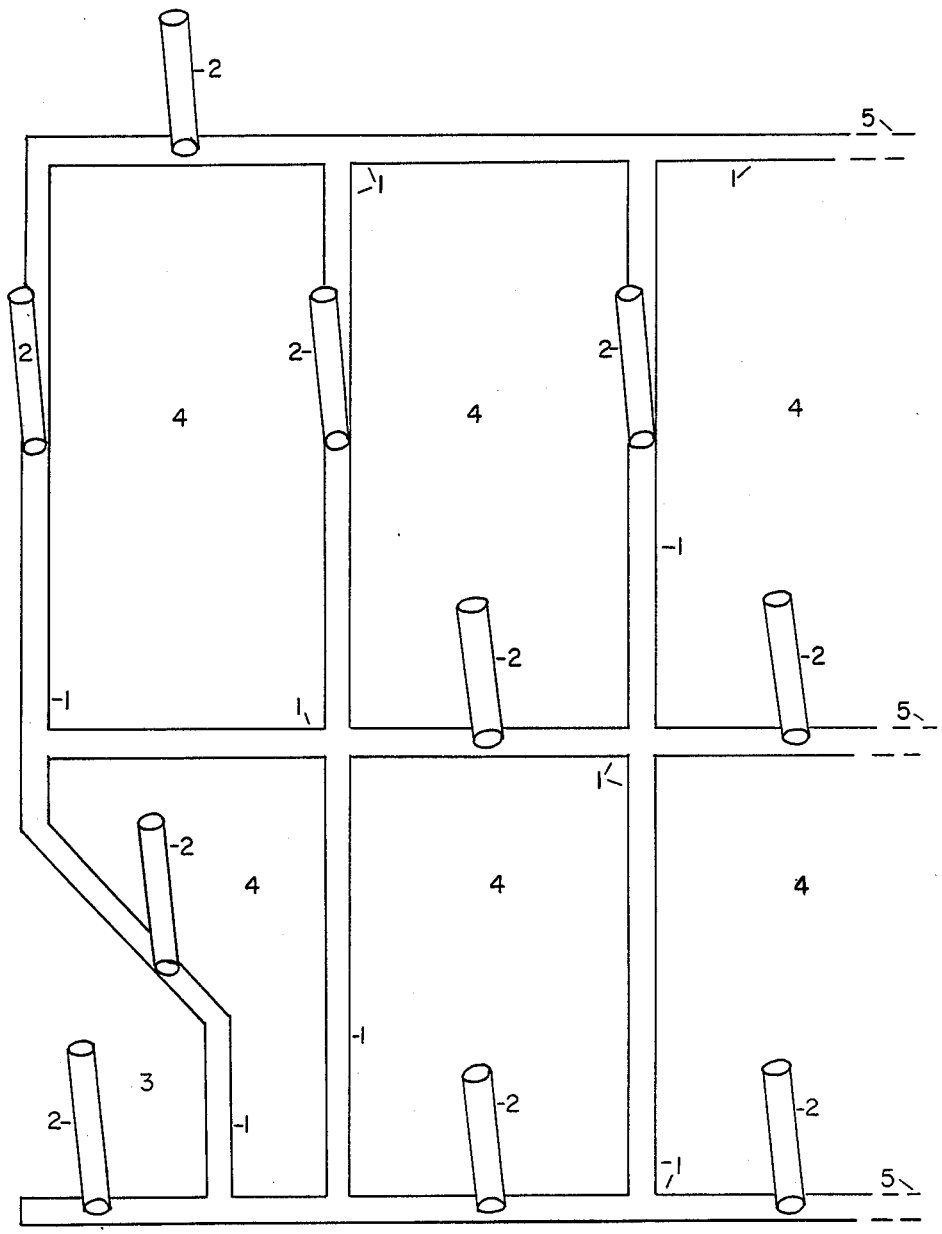

UNIFIED MONITORING SYSTEM FOR HAZARDOUS AND TOXIC WASTE

BACKGROUND OF THE INVENTION

1. Field of the Invention

This invention is a new and unified three dimensional monitoring system that is useful in intercepting and monitoring leachates and other fluids that escape from any of the types of structures and areas for collecting, storing and/or treating of hazardous waste material. The schedule for recording the activity at each vertical pipe station gives an early warning of any potential problem and an estimate of the leachate production from the sources, such as a landfill.

2. Description of the Related or Prior Art

There is limited background art for monitoring hazardous waste where some past practices included dumping into the nearest stream or any convenient place without thought of the consequence. Some family units and/or municipalities channeled liquid waste to cesspools or lagoons and hauled the more solid waste to dump areas or a dugout or valley with little or no consideration for ground water or any form of monitoring. Some of these practices continue in less densely populated areas today. Some large world cities have continued their refuse piles since medieval times.

The advances in computer science have produced the "Geographic Information System," commonly referred to as GIS. Geographic reference data are conveniently handled. Digitized data sources are available through the U.S. Geological Survey, State Geological Surveys, State Water Commissions, the U.S. Soil Conservation Service, and others.

The Environmental Protection Agency (EPA) has clear practical regulations for assessing landfill performance with their Hydrologic Evaluation of Landfill Performance, known as the HELP model. This model is readily available and uses all of the hydraulic, soil and barrier soil parameters including liners, and their leakage fractions, slope, area, natural internal and lateral drainage precipitations, and geologic setting and water table.

With the data and guides from EPA, the State Health Departments can assess their regional and local ground water pollution potential and designate, with the aid of the Water Commission and Federal and State Geological Survey, hydrologically sensitive areas to help in the selection of waste sites and comply with the legal standards that are emerging with experience. Simple compaction of the waste, leaking liners, and cover soil to protect from rodents and flies is no longer tolerated or legal. Methods of monitoring are introduced with each design that is patented for compartments for receiving and storing hazardous waste, including pits, bins, and vaults above ground that employ down spouts rather than mechanical pumping from a liquid collection arrangement for accumulating leakage or leachate from the bin or secondary temporary storage facilities. Other devices with a hopper-like holding compartment lined with liquid impervious liners and a leakage treatment compartment below the hopper bottom, and a drain system for further treatment and/or disposal is reported by U.S. Pat. No. 4,624,604, Nov. 25, 1986. Even these landfills and surface impoundments may leak chemical waste which could enter the natural ground water supply, especially where ten years is considered the life of some liner material.

This prior art used by some municipalities, land managers and other hazardous waste generators includes randomly drilled wells in, and/or near the edges of the deposits. This is followed at places by visual and photographic monitoring by airplane to chart the results of surface reclamation of the waste site. This sees only the surface.

Today, monitoring begins with modeling for the pollution potential known by the acronym DRASTIC. This uses a simple summation of weighting times a factor to obtain an index, using Depth to water, net Recharge, Aquifer, Soil media, Topography, Impact of vadose zone media, and hydraulic Conductivity. The site selected and approved is then constructed according to specifications for the type of waste material. The pits, bins and impoundments or landfills may have a considerable range in depth from 20 feet and more to surface facilities and areas of less than 2 acres to more than 20 acres. This data base is the true beginning of monitoring and requires a unified monitoring system to control all parts of the disposal site not given (included) in the prior art.

SUMMARY

This invention relates to a new and efficient unified monitoring system for hazardous and toxic waste deposits and the protection of natural ground water supplies by a controlled data collection process from a modular network of lateral perforated collector pipes and vertical monitoring pipe wells throughout and about the waste deposit to monitor and provide collective data and a model of the status of the entire disposal area not available in the prior art.

BRIEF DESCRIPTION OF THE DRAWING

The FIGURE of the drawing shows the unified monitoring system of lateral and vertical pipes.

DETAILED DESCRIPTION OF THE INVENTION

Reference is now made to the drawing of the invention which embodies a network of lateral collector pipes 1, and vertical monitoring pipes 2. This modular structure is composed of standard polyvinyl chloride (PVC), of acrylonitrile butadiene styrene (ABS) resin solid wall extended construction drain or vent pipe.

Both types of pipe have excellent positive performance records, some for many miles in metropolitan areas. The solvent welded joint sections and tee and wye saddles, and cross joints are thus a chemically bonded "no joint" system.

PVC drain, waste, and vent pipe specified under American Standards for Testing and Materials (ASTM) designation D-1785 Schedule 40 solvent weld or gasketed fittings and ABS solid wall pipe under ASTM designation D-2751 are excellent gravity sewer and drain pipe. The pipe comes in 12½ and 20 foot lengths, and the six inch diameter pipe weighs less than four pounds per lineal foot, contributing to easy handling and rapid installation.

It should be understood that this unified monitoring system is adjustable to each design of hazardous waste disposal site ranging from large backfill of fly ash, wet bottom ash, and scrubber sludge material from coal-fired electrical generating power plants and coal gasification plants, and other industrial facilities, to sidehill trenches and sloped (graded) floor pits for landfill refuse, to ground surface installations for receiving and retaining hazardous and toxic waste. The lateral 6 inch outside diameter (OD) perforated collector pipes 1 are laid and embedded holes down in fine aggregate commonly used as filter sand for subdrains.

Perforations in the lateral pipe 1 are usually made by the supplier of the pipe. The specifications for subdrains used by North Dakota State Highway Department are recommended for embedding the unified monitoring system of the subject invention. Pipe 1 shall be 6 inch diameter polyvinyl chloride drain pipe with solvent cemented joints or gasketed fittings. The vertical pipes 2, shall be 4 inch or 6 inch diameter polyvinyl chloride drain pipe with solvent cemented joints or gasketed fittings. Perforations in pipe 1 shall be circular and $\frac{1}{4}'' \pm 1/16''$ in diameter. The holes should be arranged in rows parallel to the axes of the pipe 1 and shall be spaced approximately 3 inches center to center along the rows. There shall be four rows of perforations, composed of (arranged as) two rows of holes on each side of pipe 1. The lower row of holes is set at the intersection of the limbs of a 90 degree angle with the wall of the pipe 1, measured from the center of the pipe. The upper row of holes is set at the intersection of the limbs of a 160 degree angle with the wall of the pipe 1. Thus, one row of perforations (holes) on each side of the pipe 1 shall be 10 degrees down from the horizontal axis or plane passing through the center of the pipe 1. The second and lower row of perforations (holes) one row on each side of pipe 1 shall be 45 degrees down from the horizontal axis or plane that passes through the center of pipe 1. The spigot and bell end shall be unperforated for a length equal to the depth of the spigot.

Perforations in a selected section of pipe 2 for venting gas, shall be circular and $\frac{1}{4}'' \pm 1/16''$ in diameter. The holes shall be spaced approximately 3 inches center to center in eight rows, four along the axes of the pipe and one row medway or 45 degrees between the axial rows. The length of the perforated vertical section of pipe 2 is determined by the thickness or width of the gaseous zone to be vented. The perforated section of vertical pipe 2 may be wrapped with filter fabric to prevent clogging of the holes.

Specifications for fine aggregate for embedment of pipe 1 are given by ASTM, C. 33, Section 4, Vol. 04.02, 1985, American Standards for Testing and Materials, and AASHTO M6 American Association of State Highway and Transportation Officials.

| Fine Aggregate Specifications: | | | |
|---|---|---|---|
| ASTM Sieve Analysis | | AASHTO* Sieve Analysis | |
| sieve specification | percent passing | sieve specification | percent passing |
| $\frac{3}{8}$ in. (9.5 mm) | 100 | $\frac{3}{8}$ in. | 100 |
| No. 4 (4.75 mm) | 95 to 100 | No. 4 | 95 to 100 |
| No. 8 (2.36 mm) | 80 to 100 | No. 16 | 45 to 80 |
| No. 6 (1.18 mm) | 50 to 85 | No. 50 | 10 to 30 |
| No. 30 (600 μm) | 25 to 60 | No. 100 | 0 to 10 |
| No. 50 (300 μm) | 10 to 30 | No. 200 | 0 to 3 |
| No. 100 (150 μm) | 2 to 10 | | |

*The AASHTO sieve specification for fine aggregate has an excellent performance record in retaining natural soil and is preferred for this embodiment.

To install the lateral low gradient pipe an embedment of fine aggregate two feed wide and six inches thick is placed along the alignment for the lateral pipe 1. Pipe 1 is then laid holes down on the fine aggregate (filter sand) and covered by 12 inches to 16 inches of fine aggregate. The entire lateral pipe 1 section or any section in the lateral structure may be encased in filter fabric, a geotextile cloth, to retain solids and fine grained particles and maintain good permeability to liquids. Polyester filter fabric which has a specific gravity greater than 1.0 will not float in wet areas. It will stay as placed and make it easier to install in wet areas.

The lateral collector pipe 1 is installed on floor 4 in a compacted fill or around tank installations or natural barriers 3. The vertical monitoring pipe wells 2, are positioned as required before and during the advance of the deposit and the lateral pipe 1 grid extension 5. Certain vertical monitoring pipes 2 may be the same diameter as the lateral pipes 1 or pipes 2 may be smaller (4 inches) in diameter, especially pipes 2 for venting gas. The vertical pipes 2 are installed in sections, progressively as a pit, trench, or surface container is filled in layers and each layer covered with lifts (layers) of compacted soil. Vertical pipes 2 are versatile and may be connected at any place in the lateral grid structure to contact all of the parts of the said deposits of hazardous waste.

In regions of cold climate the upper twelve feet or more of the capped vertical pipes 2 can be installed with electrical heating tape or cord in the annulus between the monitoring pipe 2 and a 12 foot long section of 8 inch diameter PVC pipe around the top 12 feet of the monitoring pipe 2, thus providing the aforementioned annulus for heating tape and physical protection and stability for the monitoring activities.

From the foregoing it will be seen that a preferred embodiment of unified, extendable network 5 of lateral collector pipes 1 and vertical monitoring pipes 2 provides complete access to all parts and surroundings of pits, sidehill trench disposal structures, and subsurface and surface compacted and/or encapsulated deposits of waste not found in the prior art.

I claim:

1. A unified monitoring system for hazardous and toxic waste and the protection of natural ground water supplies for use with subsurface and surface landfills, hillside trenches, and open cut surface mine pits for utility disposal sites, said system including a modular network of lateral perforated polyvinyl chloride (PVC) collector pipes embedded in specified fine aggregate encased in filter fabric and vertical (PVC) monitoring pipe wells, said pipes functioning as monitors under, around and throughout the waste deposits, said system being expandable as the hazardous waste deposit is enlarged and increased.

2. A waste monitoring system set forth in claim 1, wherein selected sections of the vertical monitoring pipe wells are perforated in rows along the pipe to vent potentially explosive gases generated by the waste, and wherein selected unperforated vertical pipes stand as pumping wells to remove leachate from the system.

* * * * *